April 28, 1931. E. D. DAVIS 1,803,006
KITCHEN UTENSIL
Filed Oct. 2, 1929
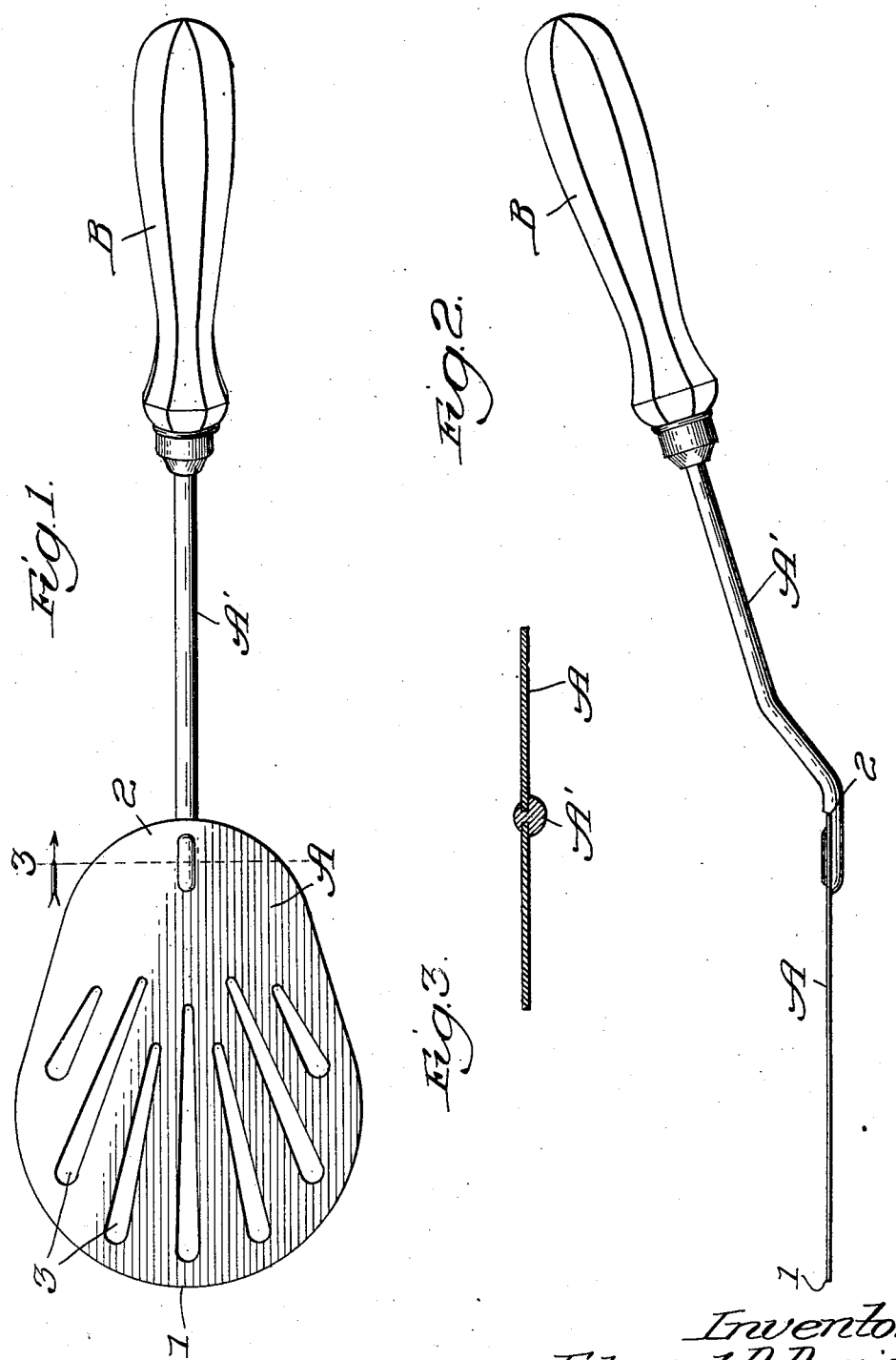

Patented Apr. 28, 1931

1,803,006

UNITED STATES PATENT OFFICE

EDWARD D. DAVIS, OF CHICAGO, ILLINOIS, ASSIGNOR TO THE BOYE NEEDLE COMPANY, OF CHICAGO, ILLINOIS, A CORPORATION OF ILLINOIS

KITCHEN UTENSIL

Application filed October 2, 1929. Serial No. 396,875.

This invention relates particularly to a kitchen utensil adapted, for example, to the purpose of turning eggs, pancakes, and the like, when they are being fried. The device is further adapted to the purpose of removing such articles of food from a frying or baking pan.

The primary object is to provide a kitchen utensil which is in the nature of a species of a spatula which is well adapted to the purpose of turning such articles of food as eggs, cakes, and so forth, while they are being fried or baked, and which is also well adapted to the removal of the prepared articles of food from a skillet, or the like.

The improved device may be used with peculiar advantage in removing fried eggs, pancakes, or the like, from a flanged pan or skillet.

The invention is illustrated in a preferred embodiment in the accompanying drawing, in which—

Figure 1 is a plan view of the improved device; Fig. 2, a side elevational view; and Fig. 3, a section taken as indicated by the line 3 of Fig. 1.

In the construction illustrated, A designates a flat thin blade equipped with a shank A'; and B, a handle applied to the shank A'.

The blade A preferably is of general triangular form, in plan, but has rounded front and rear edges, as indicated at 1 and 2, respectively.

The blade A preferably is made of very thin gage tempered steel, and preferably is provided with elongated slots 3. These slots are gradually tapering slots whose outer ends are wider than the inner ends. Preferably, the grouping is such as to provide one central longitudinal slot, the other slots being grouped on opposite sides of the central slots and set obliquely. The purpose is to give flexibility to the short spatula-blade A.

It will be noted that the rounded front edge 1 of the blade is substantially a semicircle. This contour permits the front edge of the blade to enter, for example, beneath a pancake which has its edge close to the rim or flange of the skillet. This advantage applies also to the entering of the implement beneath an egg for the purpose of lifting or turning the edge. A further advantage incident to the contour of the blade is that the blade conforms, in a general way, to the natural contour of the egg, pancake, or the like, as it forms in the skillet or baking dish.

In turning or lifting eggs, for example, the blade may be inserted beneath one egg without disturbing a closely adjacent egg. This applies, also, to pancakes. It is also incidental to the form of the blade that the blade may be inserted more readily beneath the egg or cake, as the case may be, without rupturing or tearing the article of food.

By employing a blade having a rounded front edge and slots to increase the flexibility of the blade, it is possible, by applying the requisite pressure, to introduce the blade beneath a pancake, for example, which is close to the rim of a skillet, without injuring the pancake.

The improved device may be put to any desired use.

What I regard as new, and desire to secure by Letters Patent, is:

A device of the character described, comprising a handle-equipped substantially flat blade of general triangular shape, but having a round-countour front edge, said blade being provided with forwardly divergent elongated slots which taper from front to rear for the purpose of giving flexibility to the blade.

EDWARD D. DAVIS.